United States Patent
Yamamoto et al.

[15] 3,665,162
[45] May 23, 1972

[54] IDENTIFICATION SYSTEM

[72] Inventors: Mititaka Yamamoto, Kyoto; Kazuhiro Kawahara, Hyogo; Tadao Morita, Kyoto, all of Japan

[73] Assignee: Omron Tateisi Electronics Co., Kyoto, Japan

[22] Filed: Dec. 11, 1969

[21] Appl. No.: 884,270

[30] Foreign Application Priority Data

Dec. 16, 1968   Japan..................................43/92201

[52] U.S. Cl......................235/61.7 B, 340/149 A, 179/2 CA
[51] Int. Cl. ..........................................................G06k 9/00
[58] Field of Search ..................340/149, 149 A; 235/61.7 B, 235/61.7, 61.11; 179/2 CA

[56] References Cited

UNITED STATES PATENTS

| 3,221,304 | 11/1965 | Enikeieff et al | 340/149 |
| 3,513,298 | 5/1970 | Riddle et al | 235/61.11 |
| 3,401,830 | 9/1968 | Mathews | 235/61.7 B UX |

*Primary Examiner*—Maynard R. Wilbur
*Assistant Examiner*—William W. Cochran
*Attorney*—Christensen, Sanborn & Matthews

[57] ABSTRACT

A system for identifying the proper user of a credit card or the like in a vending machine or the like. Each card used in the system is given an identification number and a key number both written on the card and a secret number previously known to the proper owner of the card. To make the secret number, the order or arrangement of the numerals constituting the identification number is changed or scrambled in accordance with a program as determined on the basis of the key number, and from the scrambled identification number some of the component numerals are removed in accordance with a program as determined on the basis of the key number, so that the remaining numerals are formed into the secret number of the card. When the card is used for a credit purchase, the system recognizes the secret number of the card from its identification number and key number in accordance with the above-mentioned programs, and then compares that secret number thus recognized with the secret number separately entered into the system by the user of the card. If the two secret numbers are found identical, the system recognizes the user of the card as its proper owner.

4 Claims, 10 Drawing Figures

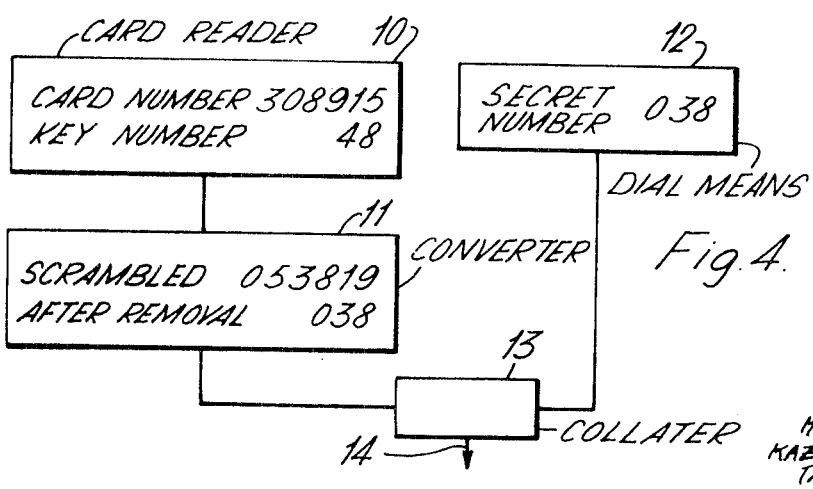

MITITAKA YAMAMOTO
KAZUHIRO KAWAHARA
TADAO MORITA
INVENTORS

BY Christensen,
Sanborn & Matthews
ATTORNEY

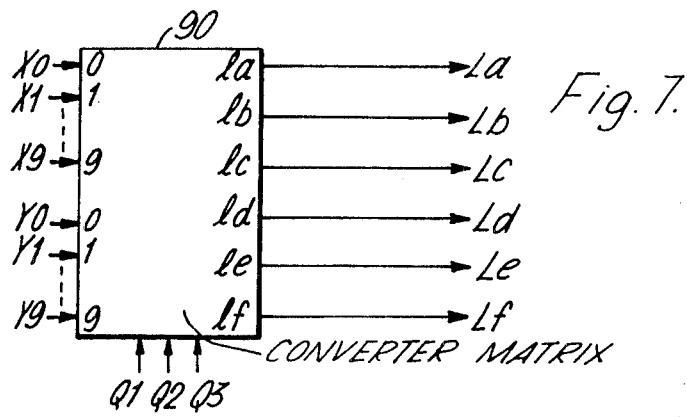
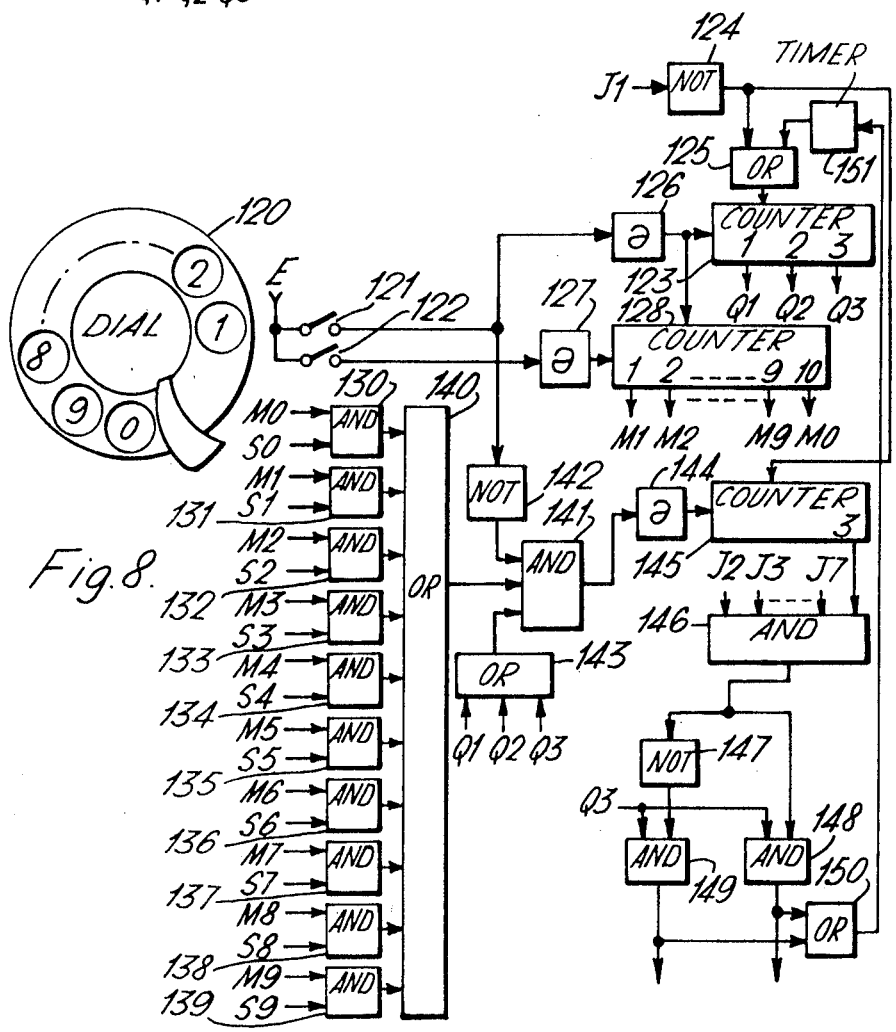

IDENTIFICATION SYSTEM

This invention relates to an identification system and, more particularly, to a system for identifying the proper user of a credit card or the like in a vending machine or the like.

In recent years credit purchasing using a personalized credit card has become very popular in hotels, restaurants and other establishments. One of the problems involved in such credit sales systems is how to prevent fraudulent use of credit cards by improper holders who happen to obtain lost or stolen cards. To protect against such improper use of the cards, it has been proposed to give each card two different code numbers, one being written on the card as the card number while the other is previously known to the proper owner of the card as its secret number, so that when a purchase is to be made, the purchaser inserts his card into the machine and at the same time enters the secret number into the machine by manually operating a dial or pushbutton keyboard. The secret number is a number obtained by converting or scrambling the card number in accordance with a predetermined program or rule. The machine unscrambles the secret number dialed thereinto and compares the unscrambled secret number with the identification number. If two numbers are found identical, the machine determines that the card has been used by its proper owner. According to this prior art system, however, the program according to which each card number is scrambled into its secret number is rather simple. Therefore, if a person happens to know several card numbers and their respective secret numbers, he will be able to know the program for scrambling the card number and decipher from a card number its corresponding secret number.

Accordingly, it is one object of the invention to provide a system for identifying the proper user of a credit card or the like in a vending machine or the like, wherein it is practically impossible to decipher the secret number from the card number.

Another object of the invention is to provide such a system as aforesaid, wherein each card is given a card number and a key number, and wherein to obtain a secret number for the card, the order or arrangement of the numerals constituting the card number is first changed or scrambled in accordance with a program as determined on the basis of the key number, and from the scrambled card number some of the component numerals are removed in accordance with a different program as determined on the basis of the key number, so that the number comprising the remaining numerals of the scrambled card number will be used as the secret number of the card.

The invention with its above and other objects, features and advantages will become clear from the following description of a preferred embodiment thereof with reference to the accompanying drawing, wherein:

FIGS. 1 to 3 show examples of the programs according to which the card number is scrambled into its corresponding secret number;

FIG. 4 is a general layout of the system of the invention;

FIGS. 5 to 8 are block diagrams of the component parts of the system;

Figures 5, 6:
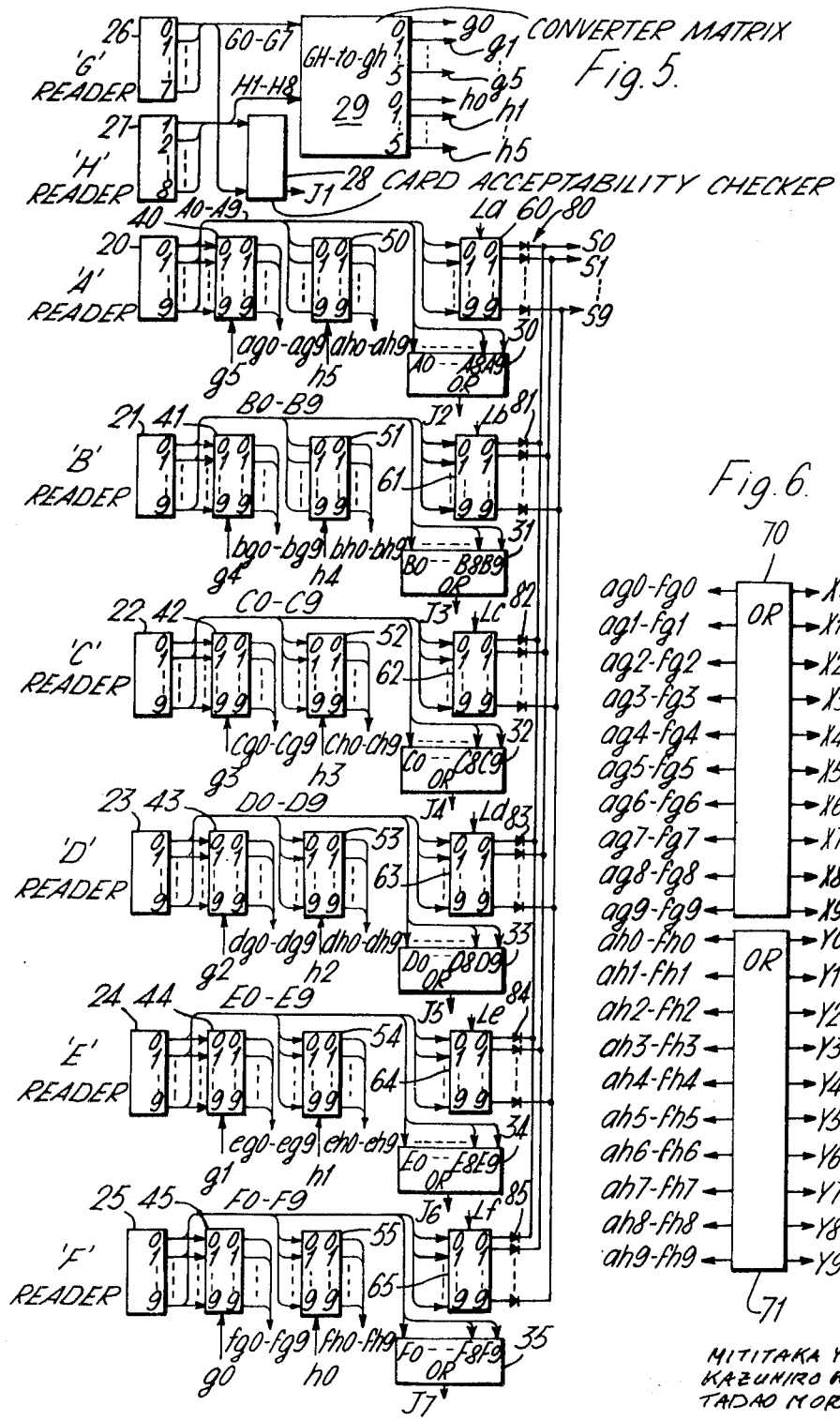

It is assumed in the illustrated embodiment that the card number is a 6-digit number comprising six numerals 'A', 'B', 'C', 'D', 'E' and 'F' arranged in the order mentioned, and that the key number is a 2-digit number comprising two numerals 'G' and 'H' arranged in the order mentioned. In FIG. 4 the card number is shown as '308915' and the key number, as '48'. The two numbers are written on the card optically, magnetically or mechanically and can be read by any suitable card reader known in the art. When the card reader reads the key number 'GH', the GH-to-$gh$ conversion is conducted in accordance with the program as shown in the table of FIG. 1. If the key number 'GH' is '48', '$gh$' will be given as '15' in the square where 'G' column No. 4 (expressing the numeral in the second place of the 2-digit key number) meets 'H' row No. 8 (expressing the numeral in the first place thereof) in the table of FIG. 1. The numeral '$g$' in the converted key number '$gh$' is used to provide the index number 'X' for indicating the arrangement or order to which the card number is scrambled, and the numeral '$h$' is used to provide the index number 'Y' for indicating which of the numerals constituting the scrambled card number are to be removed therefrom. In the illustrated example, since the numeral '$g$' is '1', the numeral at the second ($10^1$) place of the card number '308915', that is, the numeral '1' will be the index number 'X' for indicating the arrangement to which the card number is scrambled, and since the numeral '$h$' is '5', the numeral at the 6th ($10^5$) place of the card number, that is, the numeral '3' will be the index number 'Y' for indicating the numerals to be removed from the card number. As shown in the table of FIG. 2, the index number '1' indicates that the card number 'ABCDEF' (=308915) be converted or scrambled into 'BFACED' (=053819), and as shown in the table of FIG. 3, the index number '3' indicates that the numerals 'D', 'E' and 'F' should be removed from the card number 'BFACED', so that the resulting number will be 'BAC', that is, '038'. Thus the card number '308915' has been converted to its secret number '038' on the basis of the key number '48'. The secret number '038' is previously known to the owner of the card numbered '308915'.

When the card is used in, say, an automatic vending machine, the user enters the secret number of the card separately into the machine. The machine reads the 6-digit card number '308915' and recognizes the 3-digit secret number in the above-mentioned manner and then compares the latter number with the secret number separately entered thereinto. If the two secret numbers are identical, the user of the card is recognized as the proper owner of the card.

The card number and the key number may be arranged so as to appear as if they were a single 8-digit number, say, like 'ABCDEFGH'. Also, some of the numerals of the card number may be used as its key number. For example, if the card number is 'ABCDEF', 'EF' may be used as its key number.

Referring to FIG. 4, a card reader 10 reads the card number '308915' and its key number '48'. A converter 11 converts the card number into '053819' in the above-mentioned manner, from which the numerals '5', '1' and '9' are removed to obtain '038'. On the other hand, the user of the card separately enters the secret number '038' he memorizes into the system by means of a dial means 12. A collator 13 compares the two outputs from devices 11 and 12 and produces an output 14 if the two input signals are identical. The output 14 may be used as a signal to actuate, say, the article dispensing mechanism of an automatic vending machine.

The key number is a number separate from the card number. As previously mentioned, however, the key number may be included in the card number. The key number may appear visibly on the card, but preferably it is invisible. The key number may be used to limit the use of the card to predetermined districts or machines.

Turning to FIG. 5, the numerals 'A', 'B', 'C', 'D', 'E' and 'F' of the card number and the numerals 'G' and 'H' of the key number are read and memorized by reading units 20 – 27, respectively. When the unit 26 reads the numeral 'G' which may be '0', '1', ..., or '7', it produces a corresponding output G0, G1 ..., or G7; and when the unit 27 reads the numeral 'H' which may be '1', '2', ..., or '8', it produces a corresponding output H1, H2, ..., or H8. These outputs are applied to a device 28 for checking if the card is acceptable or not. If the number 'GH' is set as acceptable in the device 28, it produces an output signal J1. In the following description, when a circuit element produces a signal, the condition will sometimes be referred to as the element producing a signal "1" or the output from the element being "1" and when a circuit element produces no signal, the condition will sometimes be referred to as the element producing a signal "0" or the output from the element being "0"; and a line and the signal on that line will sometimes be designated by the same reference symbol.

When the output J1 from the device 28 remains "0", further operation of the system must be prevented. To this end, the signal J1 is applied as an input to a NOT element 124 in FIG. 8 to be described later.

The signals G0 – G7 and H1 – H8 from the reading units 26 and 27 are applied to a converter matrix 29. This matrix performs the previously described GH-to-gh conversion and has outputs $g0 - g5$ and $h0 - h5$. The matrix 29 is so arranged that when the key number 'GH' is '48', the number 'gh' will be '15', that is, when the input signals G4 and H8 to the matrix are "1", the outputs $g1$ and $h5$ therefrom will be "1".

Figure 9:
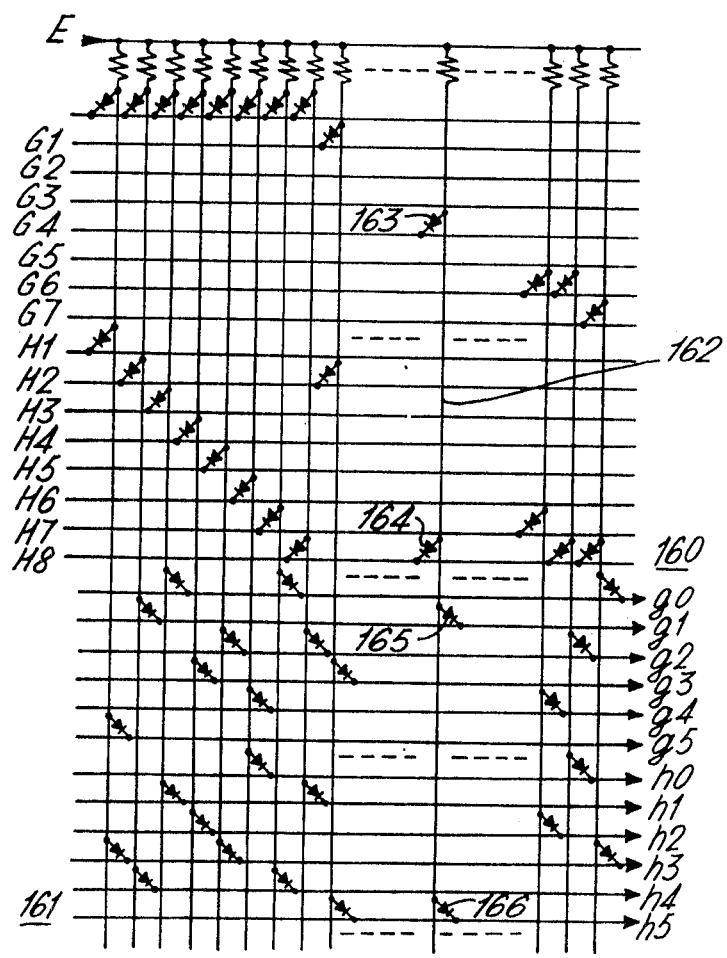
FIG. 9 is a detailed circuit diagram of the converter matrix as shown in FIG. 5.

As shown in detail in FIG. 9, the matrix 29 comprises a diode AND matrix 160 and a diode multiplier matrix 161. The matrix 160 is so arranged that it receives from the reading unit 26 the signals G0 – G7 expressing the numerals '0' – '7', respectively, and from the unit 27 the signals H1 – H7 expressing the numerals '1' – '8', respectively, and produces outputs corresponding to the numbers GH=01 through GH=78. The matrix 161 is so arranged that it converts the number 'GH' into a corresponding number 'gh'. To this end, the diodes 163 and 164, for example, connect the input lines G4 and H8 to the line 162 in the diode 160, so that when both signals G4 and H8 becomes "1", a signal "1" appears on the line 162. This signal "1" causes the signals $g1$ and $h5$ to become "1" through diodes 165 and 166 in the matrix 161. Thus, the number GH=48 has now been converted to the number gh=15.

The numerals 'A' – 'F' are read by reading units 20 – 25, respectively, which produce output signals A0 – A9, B0 – B9, ..., F0 – F9, respectively, expressing the numerals '0' – '9'. For example, when the numeral 'A' is '3', the signal A3 becomes "1" and when the numeral 'B' is '0', the signal B0 becomes "1". These signals are applied to OR elements 30 – 35 (FIG. 5), which produce outputs J2 – J7, respectively, when the numerals 'A' – 'F' have been read by the corresponding reading units. For example, if the numeral 'A' has been recognized as '3', the signal A3 becomes "1", so that the output signal J2 from the OR element 30 becomes "1". If there is no numeral 'A' read from the card, all the signals A0 – A9 remains "0" so that the output J2 from the OR element 30 remains "0". When all the signals J2 through J7 have become "1", the numerals 'A' – 'F' are recognized as constituting a 6-digit number. The signals J2 – J7 are applied to an AND element 146 in FIG. 8. As will be described later in detail, the element 146 produces an output only when all the signals J2 – J7 have become "1".

The outputs A0 – A9, B0 – B9, ..., F0 – F9 are also applied as inputs to gate circuits 40 – 45, respectively. These gate circuits receive as a control signal the outputs $g5 - g0$ from the converter matrix 29, respectively. When the control signals $g5 - g0$ become "1", the gate circuits 40 – 45 produce outputs $agn, bgn, ..., fgn$ (wherein n is 0, 1, 2, ..., or 9), respectively. For example, when the numeral 'g' is '1' so that the signal $g1$ alone is rendered "1", the output E1 from the reading unit 24 that reads the numeral 'E' (which has been assumed to be '1') in the second place of the card number 'ABCDEF' becomes "1", thereby causing the output $eg1$ from the gate 44 to become "1". Thus, the numeral 'g' (which is 0, 1, 2, ..., or 5) obtained by the converter matrix 29 determines the place (which is $10^0, 10^1, ...,$ or $10^5$) at which one of the numerals 'A', 'B', 'C', 'D', 'E' and 'F' is read by the corresponding one of the reading units 20 – 25. In the illustrated embodiment, since the numeral 'g' is '1', the numeral 'E' (=1) in the 2nd (=$10^1$) place of the card number 'ABCDEF' is read by the reading unit 24. The numeral 'E' (=1) determines the program according to which the card number is scrambled as will be described hereinafter.

The outputs $agn, bgn, ..., fgn$ (wherein n is 0, 1, 2, ..., or 5) from the gate circuits 40 – 45 corresponding to the numerals 'A', 'B', 'C', 'D', 'E' and 'F', respectively, are applied to an OR element 70 in FIG. 6. The output Xn (wherein n is 0, 1, 2, ..., or 9) from the element 70 expresses the previously described index number X for changing or scrambling the order or arrangement of the numerals 'A' – 'F' of the card number. The output lines $ag0, bg0, ...$ and $fg0$ are connected as a single group to the OR element 70; the output lines $ag1, bg1, ...$ and $fg1$ are connected as a single group to the element 70; and in a similar manner, the output lines $ag2, ...$ and $fg2$; $ag3, ...$ and $fg3$; .....; and $ag9, ....fg9$ are connected as a single group respectively to the element 70. When one of the inputs of each group, for example, $ag0, ..., fg0$ becomes "1", the output X0 is rendered "1".

The outputs from the reading units 20 – 25 are also applied to gate circuits 50 – 55, respectively. The gate circuits 50 – 55 are of the same construction as the previously mentioned gate circuits 40 – 45. The outputs $h5 - h0$ of the converter matrix 29 are applied as a control input to the gate circuits 50 – 55, respectively. When the control inputs $h5 - h0$ become "1", the gate circuits 50 – 55 produce outputs $ahn, bhn, ...$ and $fhn$ (wherein n is 0, 1, 2, ..., or 9), respectively. For example, when the control input $h5$ alone is "1", the output A3 from the reading unit 20 corresponding to the numeral 'A' (which has been assumed to be '3') in the 6th ($10^5$) place of the card number 'ABCDEF' (=308915) causes the gate circuit 50 to render its output $ah3$ "1". Thus, the numeral 'h' (which is 0, 1, 2, ... or 5) obtained by the matrix 29 determines the place ($10^0, 10^1, ...,$ or $10^5$) at which one of the numerals 'A' – 'F' is to be read by the corresponding one of the reading units 20 – 25. In the illustrated embodiment, since the numeral 'h' is '5', the numeral 'A' (=3) in the 6th (=$10^5$) place of the card number 'ABCDEF' is read by the reading unit 20. The numeral 'A' determines the program according to which some of the component numerals are to be removed from the scrambled card number as will be described hereinafter.

The outputs $ahn, bhn, ..., fhn$ (wherein n is 0, 1, 2, ..., or 9) from the gate circuits 50 – 55 corresponding to the numerals 'A', 'B', ..., and 'F', respectively, are applied to an OR element 71 which is of the same construction as the OR element 70. The output Yn (wherein n is 0, 1, 2, ..., or 9) from the OR element 71 expresses the previously described index number Y for indicating which of the component numerals of the scrambled card number are to be removed therefrom.

Figure 10:
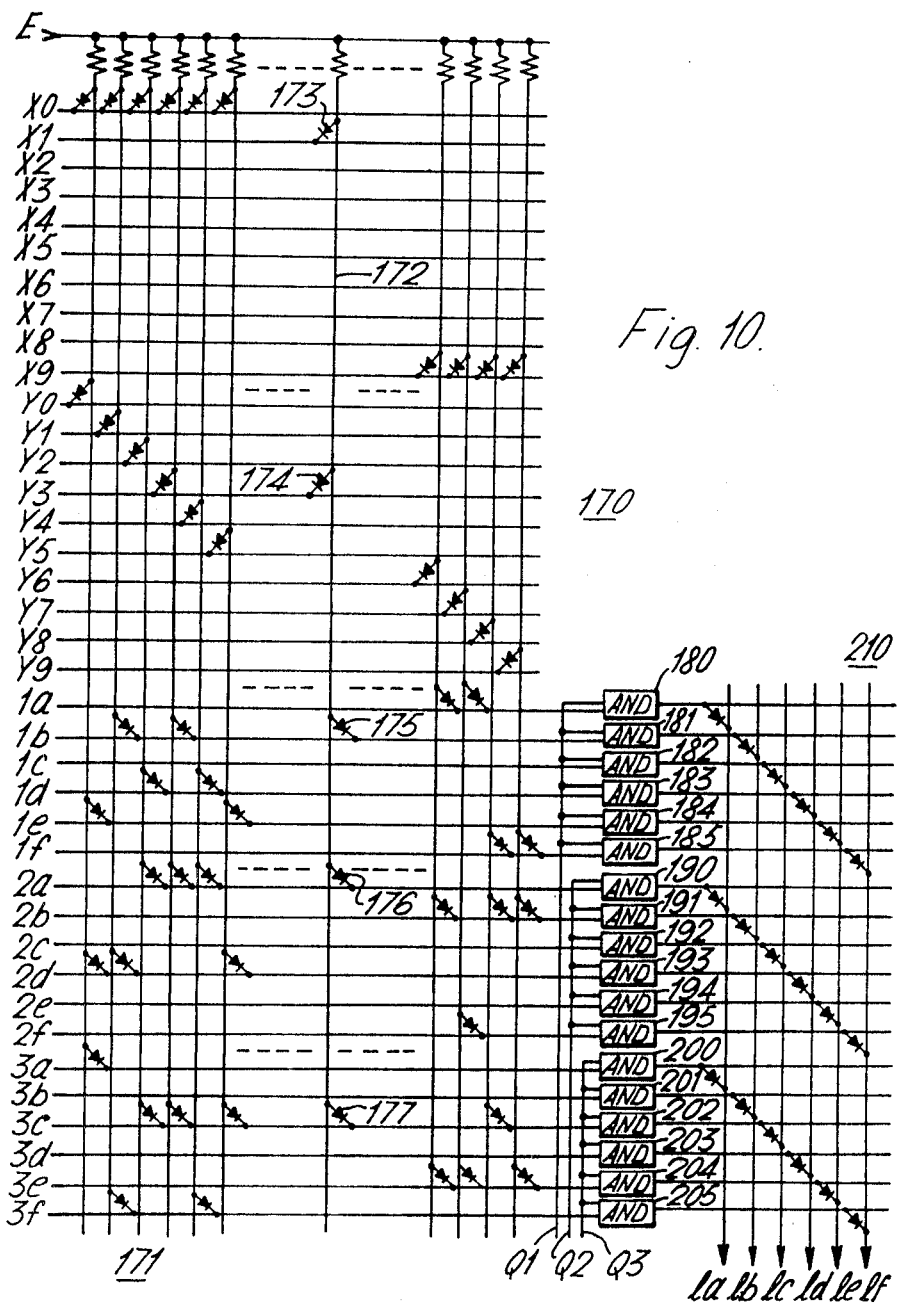
FIG. 10 is a detailed circuit diagram of the converter matrix as shown in FIG. 7.

The outputs X0 – X9 and Y0 – Y9 from the OR elements 70 and 71 are applied to another converter matrix 90 (FIG. 7). The matrix 90 converts the card number into a corresponding secret number in accordance with the programs in the tables of FIGS. 2 and 3 as determined by the index numbers Xn and Yn. When the index numbers have been determined, the secret number is also determined. The matrix 90 will be described in detail later with reference to FIG. 10.

When a credit card has been introduced into the machine, the user of the card manually introduces into the machine a 3-digit number he memorizes as the secret number of the card. The introduction may be conducted by means of a dial 120 (FIG. 8). The dial may be of the same construction as that used in a telephone and has two switches 121 and 122. The switch 121 is closed when the dial begins to be turned and kept closed while the dial is being turned and then opened when the dial has been returned to the original position. While the dial is returning counter-clockwise to the original position after having introduced a required number (which may be 0, 1, ..., or 9) into the system, the switch 122 is repeatedly operated to produce the same number of pulses as the number just dialed into the system. The pulses produced by the switches 121 are applied to a pulse counter 123 through a differentiator 126. Therefore, the counter 123 counts the number of operations of the dial 120, that is, the number of the digits of the secret number to be dialed into the system. In the illustrated embodiment, since the secret number is a 3-digit number, three pulses are successively applied to the counter 123, which has its output shifted from its output terminal Q1 to Q2 and thence to Q3.

The previously mentioned signal J1 (FIG. 5) is applied as a reset signal to the counter 123 through the NOT element 124 and an OR element 125. Therefore, when the signal J1 is "0", the reset signal is "1" so that the counter 123 does not operate, while when the signal J1 becomes "1", the reset signal becomes "0" so that the counter 123 is ready to operate. This means that it is only when the card introduced is acceptable that the counter 123 can operate.

The outputs Q1 – Q3 from the counter 123 are applied to the converter matrix 90 (FIG. 7), the outputs 1a – 1f from which determine the order in which those three of the numerals 'A' – 'E' which are selected by the index numbers X and Y are arranged for a 3-digit secret number. To explain it in detail with reference to FIG. 10, the matrix 90 comprises a diode AND matrix 170, a diode multiplier matrix 171 and a diode OR matrix 210. The signals X0 – X9 and Y0 – Y9 are applied as inputs to the matrix 170 to produce outputs of XY=00 through XY=99. In accordance with the output from the matrix 170, the matrix 171 determines which three of the six numerals 'A', 'B', . . . , 'F' constituting the card number are to be arranged into a corresponding secret number. Suppose, for example, that the input X1 and Y3 are both "1". Then a signal appears on the line 172 of the matrix 170, so that in the matrix 171 the signals on the lines 1b, 2a and 3c become "1" through the diodes 175, 176 and 177, respectively. This means that when X = 1 and Y = 3, the numerals 'B', 'A' and 'C' are chosen as the secret number for the card number 'ABCDEF'. In other words, when an index number has been determined for each of Y and X, the X determines the program according to which the arrangement of the numerals of the card number is changed or scrambled and the Y determines which three of the component numerals are to be removed from the scrambled card number so that the remaining numerals serve as the secret number for the card number.

The matrix 171 includes a first group of lines 1a, 1b, . . . , 1f; a second group of lines 2a, 2b, . . . , 2f; and a third group of lines 3a, . . . , 3f. The lines of the first group correspond to the numerals 'A', 'B', . . . , 'F', respectively, which are to be selected as the numeral at the third ($10^2$) place of the 3-digit secret number and are connected as one input to AND elements 180 – 185, respectively. The output Q1 from the previously described counter 123 is applied as the other input to each of the AND elements 180 – 185. Therefore, when the dial 120 is turned for a first time, it is determined which of the numerals constituting the card number is to be chosen as the number at the third ($10^2$) place of the 3-digit secret number.

In like manner, the lines 2a, 2b, . . . , 2f of the second group correspond to the numerals 'A', 'B', . . . , 'F', respectively, which are to be selected as the numeral at the second ($10^1$) place of the 3-digit secret number and are connected as one input to AND elements 190 – 195, to each of which the output Q2 of the pulse counter 123 is applied as the other input. Therefore, when the dial 123 is turned for a second time, it is determined which of the numerals constituting the card number is to be chosen as the numeral at the second place of the secret number.

The lines 3a, . . . , 3f of the third group correspond to the numerals 'A' – 'F', respectively, which are to be selected as the numeral at the first ($10^0$) place of the secret number and are connected as one input to AND elements 200 – 205, respectively, to each of which the output Q3 from the counter 123 is applied as the other input. Therefore, when the dial is turned for a third and last time, it is determined which of the numerals constituting the card number is to be chosen as the numeral at the first ($10^0$) place of the secret number.

The outputs from the AND elements 180 – 185, 190 – 195 and 200 – 205 are applied to a diode OR matrix 210 having output lines 1a – 1f corresponding to the numerals 'A' – 'F', respectively. Gate circuits 60 – 65 are of the same construction as the previously mentioned gate circuits 40 – 45 and 50 – 55 and receives as their respective inputs the outputs An, Bn, . . . , Fn (wherein n is 0, 1, 2, . . . , or 9) from the reading units 20 – 25. The outputs from the gate circuits 60 – 65 appear as signals S0 – S9 through diode matrixes 80 – 85, respectively. These matrixes are of the same construction as the OR circuits 70 and 71 in FIG. 6. Suppose that as the dial 120 is turned three times, the signals Lb, La and Lc from the matrix 90 becomes "1" successively. Then, the gate circuits 61, 60, 62 are successively opened so that a signal successively appears on those of the lines S0 – S9 which correspond to the numerals 'B', 'A' and 'C'. For example, if A=3, B=0 and C=8, the output B0 from the reading unit 21 causes the gate circuit 61 to produce a signal on the line S0 and the output A3 from the reading unit 20 causes the gate circuit 60 to produce a signal on the line S3 and then finally the output C8 from the reading unit 22 causes the gate circuit 62 to produce a signal on the line S8. This means that the secret number is '038'. This number is compared with the number memorized and entered separately into the system by the user of the card.

As previously described, the user of the card introduces its secret number by means of the dial 120, and the switch 121 is kept closed from the time when the dial begins to be turned clockwise to a desired number until the time when it has been returned to the original position, and the switch 122 is repeatedly operated the same number of times as the dialed number. The pulses produced by the operation of the switch 122 are applied to a counter 128 through a differentiator 127. The counter 128 has ten output lines M1, M2, . . . , M9 and M0, and from the output condition on these output lines it is possible to know the dialed number. For example, when '0' is dialed at first, the switch 122 is repeatedly closed ten times until the counter 128 has its output shifted onto the line M0. The counter 128 is reset by the output from the differentiator 126, that is, when turning of the dial 120 has been started. For example, when turning of the dial 120 is started to enter the number '3' into the system after dialing of the number '0' has been finished, the counter 128 is reset, and when the number '3' has been dialed, the output M3 from the counter 128 becomes "1".

The outputs Mo through M9 are applied as one input to AND elements 130 through 139, respectively, to which the outputs S0 through S9 from the diode OR matrixes 80 – 85 in FIG. 5 are applied as the other input for checking the proper correspondence between the secret number of a card and the number memorized by the user of the card as its secret number. The latter number will sometimes be referred to as the memorized secret number hereinafter. If the two numbers are both '038', the signals M0, S0; M3, S3; and M8, S8 become "1", so that the outputs from the AND elements 130, 133 and 138 become "1" in succession. In other words, if the 3-digit secret number coincides with the 3-digit memorized secret number, the outputs from the corresponding three of the AND elements 130 – 139 are rendered "1".

The outputs from the AND elements 130 – 139 are applied as one input to an AND element 141 through an OR element 140. The AND element 141 receives as a second input the output from a NOT element 142 and as the third input the output from an OR element 143. Since the signal produced upon closing of the switch 121 is applied to the input of the NOT element 142, the output from the NOT element 142 becomes "1" only after the dial 120 has completely returned to the original position. The NOT element 142 is provided to ensure that it is only after the dial 120 has been completely stopped that collation of each numeral of the dialed memorized number with each corresponding numeral of the secret number obtained from the card number is effected. The outputs Q1 – Q3 from the counter 123 are applied to the OR element 143. Since the signal Q1 – Q3 successively become "1" as the three numerals constituting the memorized secret number are successively dialed into the system, the OR element 143 ensures that if a fourth numeral has been dialed, no collation will be conducted.

The output from the AND element 141 is applied to a counter 145 through differentiator 144. When the numerals at each corresponding pair of the three places of the 3-digit secret number and memorized number are identical, the counter 145 receives three input pulses so that it produces an output at its terminal 3. However, if the numerals at any corresponding pair of the places of the two 3-digit numbers do not coincide, the output signal from the counter 145 remains "0".

The counter 145 receives its reset input signal the output from the NOT element 124, the input to which is the output signal J1 from the device 28 for checking the acceptability of the card. When the card is acceptable, the signal J1 becomes "1", so that the reset signal is "0" thereby conditioning the counter 145 ready to operate. If the card introduced is not acceptable, the counter 145 remains reset and cannot operate.

The output at the terminal 3 of the counter 145, which becomes "1" when the secret number and memorized number coincide, is applied as one input to an AND element 146, to which the signals J2 – J7 are also applied as the other six inputs. These signals J2 – J7 are the outputs from the OR elements 30 – 35 (FIG. 5) which becomes "1" only when the card number is a 6-digit number. Otherwise, that is, if any one of the signals J2 – J7 remains "0", the AND element 146 produces no output. Therefore, the output from the AND element 146 becomes "1" only when the card number is a clearly written 6-digit number and the secret number and the memorized number are identical. The output from the AND element 146 is applied to a NOT element 147 and an AND element 148. The output from the NOT element 147 is applied as one input to an AND element 149. The output Q3 from the counter 123 is applied as the other input to the AND elements 148 and 149. Since the signal Q3 becomes "1" when dialing of the numeral at the first place of the memorized secret number has been finished, collation of the secret number and the memorized number is performed only after dialing of the 3-digit memorized number has been completed. When the signal Q3 becomes "1", if the secret number and the memorized number coincide, the output from the AND element 148 is rendered "1", while if they do not, the output from the AND element 149 is rendered "1".

When the output from the AND element 148 is rendered "1", it means that a proper correspondence exists between the credit card and the person who has used the card in the system. Therefore, the output from the AND element 148 may be used to actuate, say, the article dispensing mechanism of an automatic vending machine, not shown. On the contrary, when the output from the AND element 149 becomes "1", it means that no proper correspondence exists between the card and its user, so that the output signal may be used, say, to collect the card into the machine not to be returned.

The outputs from the AND elements 148 and 149 are applied as a reset input to the counter 123 through an OR element 150, a timer 151 and an OR element 125, so that when the checking has been finished, the counter 123 is reset to make the system ready for the next operation.

What we claim is:

1. A system for identifying the proper user of a credit card or the like in a vending machine or the like, said card having an identification number and a key number recorded thereon, comprising: means for receiving said card introduced into said system; means for reading the identification number and key number of said card; means for converting said key number to a predetermined different number; means for scrambling the arrangement of the numerals constituting said identification number in accordance with a program as determined on the basis of at least one of the numerals constituting said converted key number; means for selecting from said scrambled identification number those numerals at the digit positions which are selected in accordance with a program which is determined by at least another of said numerals of said converte key number, said selected numerals comprising a secret number of said card; me manually operated by the user of said card to enter into said system a number memorized by said user as the secret number of said card; means for checking whether said secret number and memorized number are identical; and means operated in response to said checking means to produce an output signal when said secret number and memorized number are identical.

2. The system of claim 1, wherein said identification number and said key number are arranged on said card so as to appear as if they were a single number.

3. The system of claim 1, wherein said key number comprises part of said identification number.

4. A system for identifying the proper user of a credit card or the like in a vending machine or the like, said card having an identification number and a key number recorded thereon, comprising: means for receiving said card introduced into said system; means for reading the identification number and key number of said card; means for converting said key number to a predetermined different number; first selecting means operated in response to said key number converting means for selecting a first numeral of said identification number in accordance with a first numeral of said converted key number, second selecting means operated in response to said key number converting means for selecting a second numeral of said identification number in accordance with a second numeral of said converted key number; means operated in response to said first selecting means to cause said reading means to read said first selected numeral of said identification number; means operated in response to said second selecting means to cause said reading means to read said second selected numeral of said identification number; means for selecting certain digit positions of said identification number in accordance with a program as determined by said selected numerals, means causing said reading means to read the numerals at said selected digit positions of said identification number as the secret number of said card; means manually operated by the user of said card to enter into said system a number memorized by said user as the secret number of said card; means for checking whether said secret number and memorized number are identical; and means operated in response to said checking means to produce an output signal when said secret number and memorized number are identical.

* * * * *